US009124793B2

(12) United States Patent
Sheu

(10) Patent No.: US 9,124,793 B2
(45) Date of Patent: Sep. 1, 2015

(54) PORTABLE ELECTRONIC DEVICE WITH ROTATABLE IMAGE CAPTURING ASSEMBLY

(71) Applicant: HON HAI PRECISION INDUSTRY CO., LTD., New Taipei (TW)

(72) Inventor: Yi-Zhong Sheu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 63 days.

(21) Appl. No.: 13/958,616

(22) Filed: Aug. 5, 2013

(65) Prior Publication Data

US 2015/0005031 A1    Jan. 1, 2015

(30) Foreign Application Priority Data

Jun. 26, 2013   (TW) ............................. 102122689 A

(51) Int. Cl.
*H04M 1/00*   (2006.01)
*H04N 5/225*  (2006.01)
*H04N 5/232*  (2006.01)

(52) U.S. Cl.
CPC ........... *H04N 5/2259* (2013.01); *H04N 5/2252* (2013.01); *H04N 5/2256* (2013.01); *H04N 5/2257* (2013.01); *H04N 5/23293* (2013.01)

(58) Field of Classification Search
CPC .. H04W 88/02; H04N 5/2259; H04N 5/2252; H04N 5/2256; H04N 5/23293; H04N 5/2257

USPC ........... 455/556.1, 550.1, 90.3, 575.1, 575.3, 455/575.4
See application file for complete search history.

(56) References Cited

U.S. PATENT DOCUMENTS

| | | | |
|---|---|---|---|
| 7,158,373 B2 * | 1/2007 | Smith | 361/679.18 |
| 7,826,205 B2 * | 11/2010 | Smith | 361/679.02 |
| 7,872,863 B2 * | 1/2011 | Lu | 361/679.56 |
| 7,894,850 B2 * | 2/2011 | Chen | 455/550.1 |
| 7,916,461 B2 * | 3/2011 | Sip et al. | 361/679.2 |
| 7,927,026 B2 * | 4/2011 | Zhang | 396/428 |
| 7,929,297 B2 * | 4/2011 | Chen | 361/679.56 |
| 8,008,592 B2 * | 8/2011 | Yang et al. | 200/343 |
| 8,023,682 B2 * | 9/2011 | Tsao et al. | 381/386 |
| 8,077,860 B2 * | 12/2011 | Lin | 379/447 |
| 8,078,240 B2 * | 12/2011 | Chang | 455/575.4 |
| 8,084,157 B2 * | 12/2011 | Wen | 429/123 |
| 8,934,226 B2 * | 1/2015 | Smith | 361/679.2 |
| 2009/0322931 A1 * | 12/2009 | Cheng | 348/345 |
| 2011/0058099 A1 * | 3/2011 | Lai | 348/373 |
| 2013/0038697 A1 * | 2/2013 | Chen | 348/47 |
| 2014/0307380 A1 * | 10/2014 | Nakamura et al. | 361/679.27 |

* cited by examiner

*Primary Examiner* — Marceau Milord
(74) *Attorney, Agent, or Firm* — Novak Druce Connolly Bove + Quigg LLP

(57) ABSTRACT

A portable electronic device includes a shell and an image capturing assembly configured to capture images. The shell includes a front surface, a rear surface facing away from the front surface, and a top surface. The top surface is connected substantially perpendicularly between the front surface and the rear surface. The top surface defines a cutout. The cutout runs through both the front surface and the rear surface. The image capturing assembly is pivotably received in the cutout and is configured to capture images.

12 Claims, 3 Drawing Sheets

PORTABLE ELECTRONIC DEVICE WITH ROTATABLE IMAGE CAPTURING ASSEMBLY

BACKGROUND

1. Technical Field

The present disclosure relates to portable electronic devices, and particularly to a portable electronic device with a rotatable image capturing assembly.

2. Description of Related Art

Due to advances in micro-circuitry and multimedia technology, camera modules are now in wide use. Portable electronic devices, such as mobile phones and personal digital assistants, are increasingly featuring multi-functional capabilities. Several come equipped with camera modules.

A camera module is positioned in a fixed location, making a shooting angle of a single camera module very small. Furthermore, if a user wants to set a delay-timer and view the shooting image on a screen of the portable electronic device in real time, installation of two camera modules is required, which is costly. In addition, the camera module can not be rotated at any angle to allow a user to conveniently take photos from any angle.

Therefore, it is desirable to provide a portable electronic device that can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
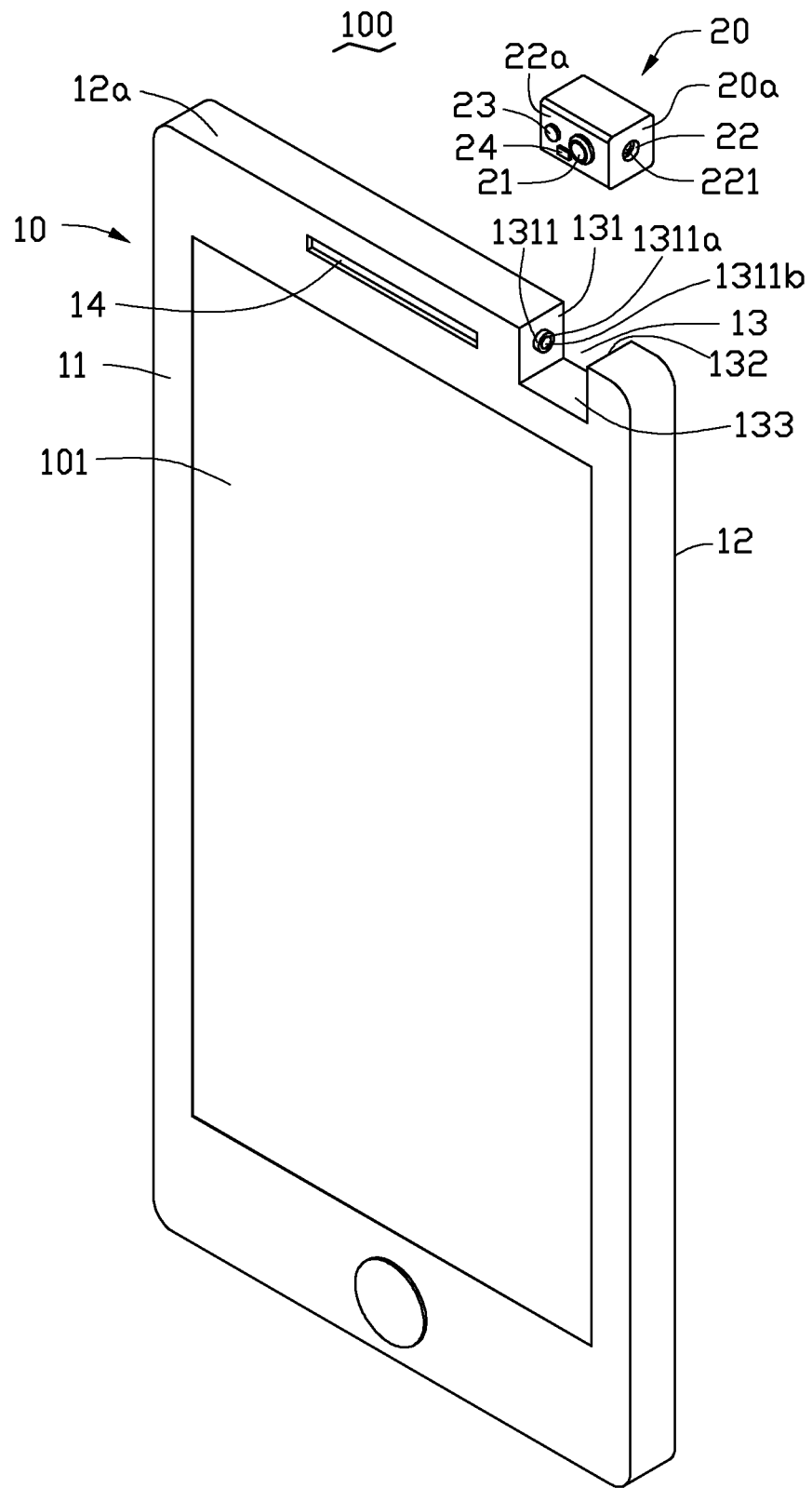
FIG. 1 is an exploded, isometric view of a portable electronic device, which includes an image capturing assembly, in accordance with an exemplary embodiment.
Figure 2:
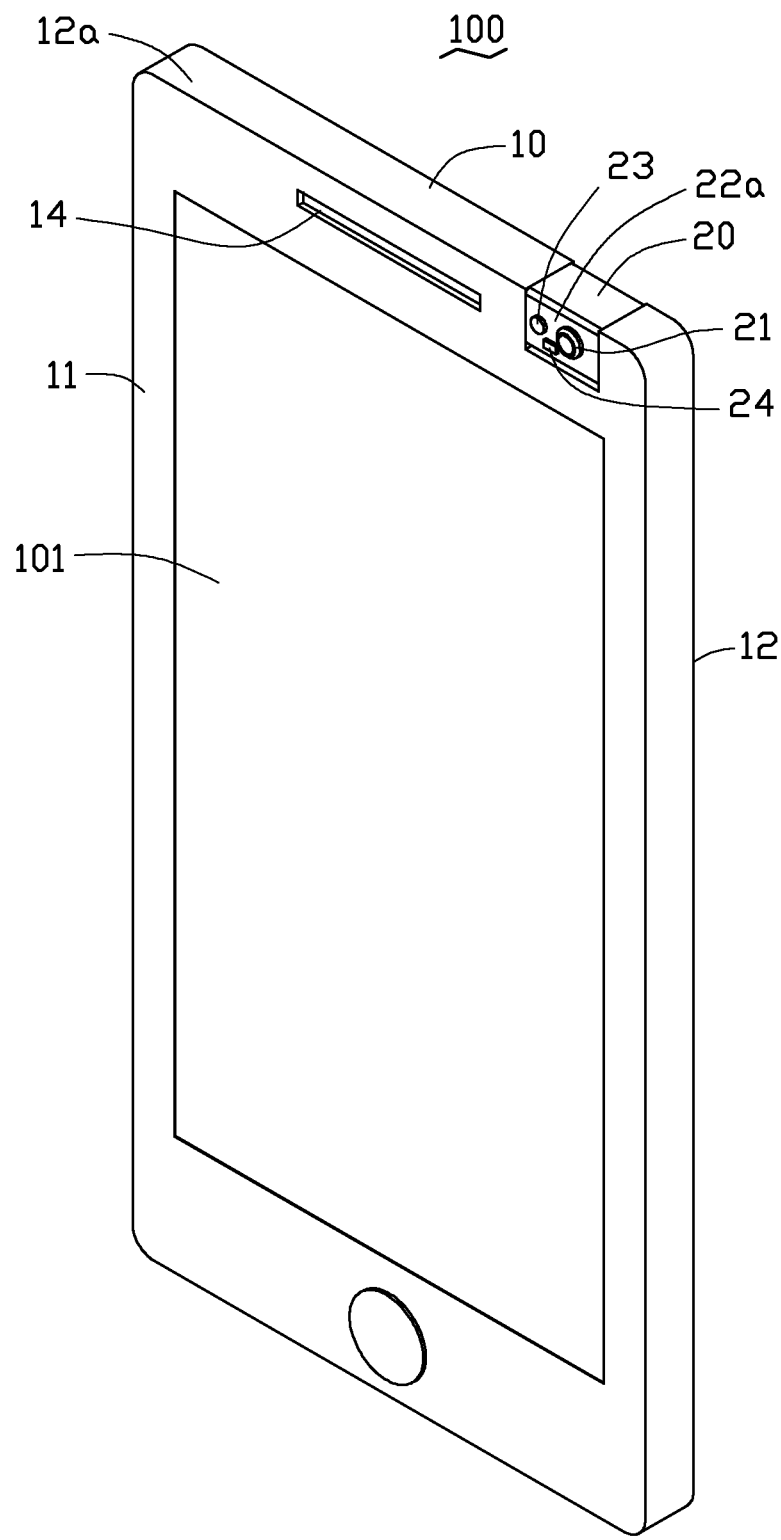
FIG. 2 is an assembled, isometric view of the portable electronic device of FIG. 1.
Figure 3:
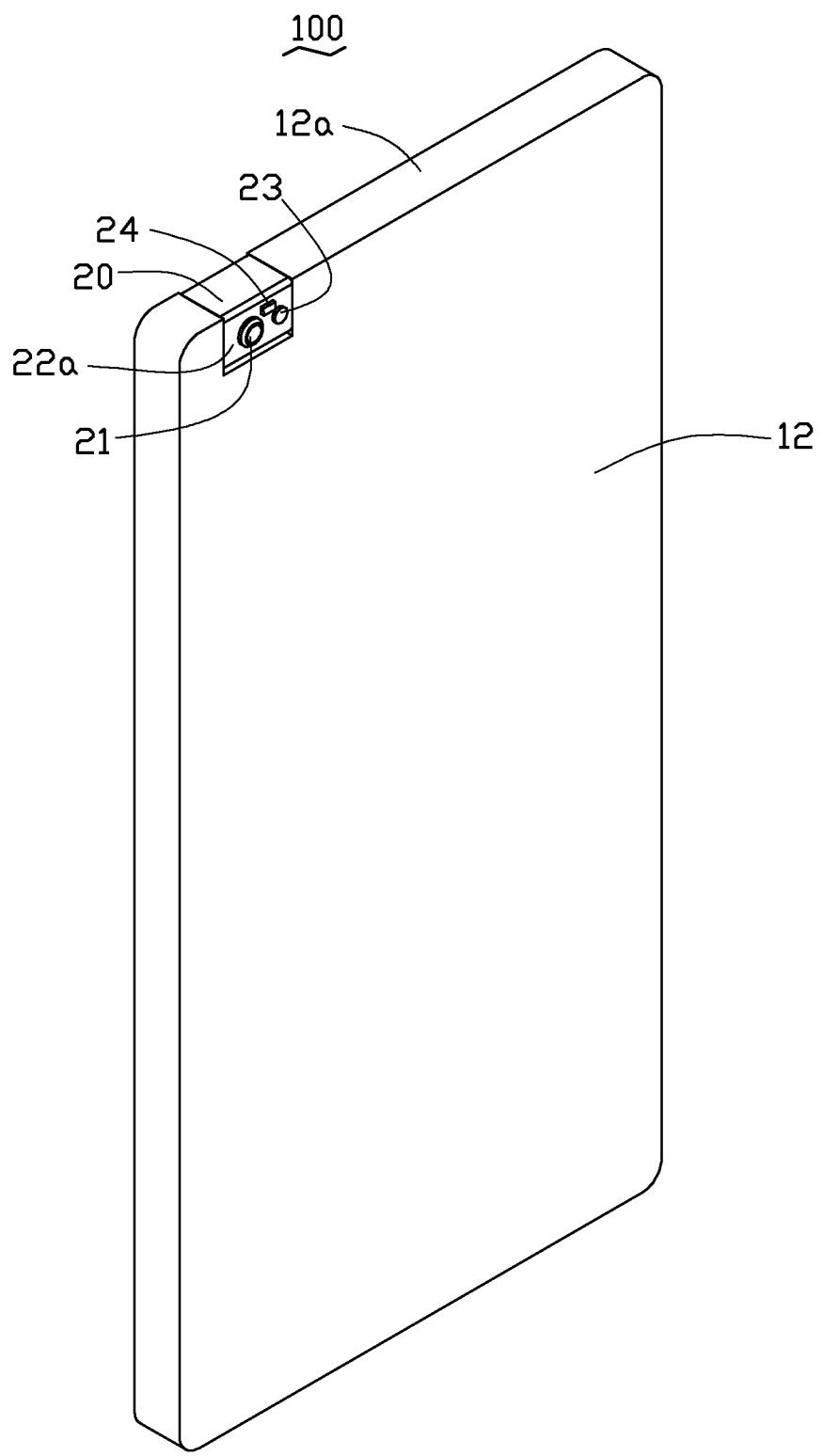
FIG. 3 is similar to FIG. 1, but with the image capturing assembly rotated 180 degrees.

FIGS. 1-3 show a portable electronic device 100. The portable electronic device 100 can be a mobile phone, a laptop, or a personal digital assistant, for example.

In this embodiment, the portable electronic device 100 is a mobile phone. The portable electronic device 100 includes a shell 10 and an image capturing assembly 20 pivotably received in the shell 10.

The hollow shell 10 includes a front surface 11, a rear surface 12 facing away from the front surface 11, and a top surface 12a. The front surface 11 is substantially parallel to the rear surface 12. The top surface 12a is connected substantially perpendicularly between the front surface 11 and the rear surface 12. The portable electronic device 100 also includes a display screen 101 and a telephone receiver 14. The display screen 101 and the telephone receiver 14 are mounted in the front surface 11 of the shell 10. In this embodiment, the display screen 101 is positioned in a center of the front surface 11. The telephone receiver 14 is positioned at an end of the front surface 11 adjacent to the top surface 12a. The display screen 101 and the telephone receiver 14 are adjacent to each other.

The top surface 12a defines a cutout 13. The cutout 13 can be located to the left or the right of the telephone receiver 14. In the embodiment, the cutout 13 is located to the right of the telephone receiver 14. The cutout 13 is substantially cuboid and runs through both the front surface 11 and the rear surface 12. The cutout 13 includes a first sidewall 131, a second sidewall 132 opposite to the first sidewall 131, and a bottom surface 133. The first sidewall 131 is substantially parallel to the second sidewall 132. The bottom surface 133 is connected substantially perpendicularly between the first sidewall 131 and the second sidewall 132.

The shell 10 includes a pair of shafts 1311. One of the shafts 1311 extends substantially perpendicularly from the first sidewall 131, while the other shaft 1311 extends substantially perpendicularly from the second sidewall 132. The shafts 1311 can be attached to the first sidewall 131 or the second sidewall 132 by an adhesive, by welding methods (e.g., plastic welding), or by other attaching methods. Each shaft 1311 includes a surface 1311a that is substantially parallel to the first sidewall 131 and the second sidewall 132. Each surface 1311a defines a first wire hole 1311b.

The image capturing assembly 20 includes a mounting surface 22a and two opposite external sidewalls 20a. The two opposite external sidewalls 20a are substantially parallel to each other. The mounting surface 22a connects substantially perpendicularly between the two external sidewalls 20a. The image capturing assembly 20 includes a camera module 21 for capturing images, a flash 23, and a light emitting diode (LED) 24. The camera module 21, the flash 23, and the LED light 24 all are mounted on the mounting surface 22a.

The image capturing assembly 20 is pivotably attached between the first sidewall 131 and the second sidewall 132. The image capturing assembly 20 has substantially a same shape as the cutout 13, such that the image capturing assembly 20 is completely received in the cutout 13. Each external sidewall 20a of the image capturing assembly 20 defines an axis hole 22. The axis holes 22 correspond to the shafts 1311.

The shafts 1311 are made of rubber material. During assembly, the image capturing assembly 20 is pushed downward along the passage defined by the first sidewall 131 and the second sidewall 132, thereby deforming the shafts 1311 toward the first and second sidewalls 131, 132. The image capturing assembly 20 is pushed downward until the shafts 1311 align with the axis holes 22. Then, the shafts 1311 rebound to be pivotably received in the axis holes 22.

The shafts 1311 are received in the axis holes 22 securely, and allow the image capturing assembly 20 to rotate at any angle in the cutout 13.

In the embodiment, the axis hole 22 is a blind hole, which includes a lower surface (not labeled). Each lower surface defines a second wire hole 221 communicating with the axis hole 22, and aligns with a respective first wire hole 1311b. The first wire holes 1311b and the second wire holes 221 contain guiding wires to electrically connect the image capturing assembly 20 to a circuit board (not shown) of the portable electronic device 100.

In use, the image capturing assembly 20 can be rotated at any angle to allow a user to conveniently take photos from any angle.

It is noteworthy that in alternative embodiments, both the LED 24 and the flash 23 can be omitted according to the configuration of the image capturing assembly 20.

It is noteworthy that in alternative embodiments, the first sidewall 131 and the second sidewall 132 can each define an axis hole 22, while the two shafts 1311 can extend substantially perpendicularly from the two opposite external sidewalls 20a.

It will be understood that the above particular embodiments are shown and described by way of illustration only.

The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A portable electronic device comprising:
a shell comprising a front surface, a rear surface facing away from the front surface, and a top surface, the top surface substantially perpendicularly connected between the front surface and the rear surface, the top surface defining a cutout, the cutout running through both the front surface and the rear surface; and
an image capturing assembly configured to capture images, the image capturing assembly pivotably received in the cutout;
wherein the cutout comprises a first sidewall and a second sidewall opposite to the first sidewall, the first sidewall is substantially parallel to the second sidewall, the shell comprises a pair of shafts, one of the shafts extends substantially perpendicularly from the first sidewall, the other shaft extends substantially perpendicularly from the second sidewall, the image capturing assembly comprises two external sidewalls facing away from each other, each external sidewall defines an axis hole, the axis holes correspond to the shafts, the shafts are rotatably received into the axis holes.

2. The portable electronic device of claim 1, wherein the portable electronic device is a mobile phone, a laptop, or a personal digital assistant.

3. The portable electronic device of claim 1, comprising a display screen, wherein the display screen is mounted in a center of the front surface.

4. The portable electronic device of claim 1, comprising a telephone receiver, wherein the telephone receiver is mounted in the front surface.

5. The portable electronic device of claim 4, wherein the telephone receiver is positioned on an end of the front surface adjacent to the top surface.

6. The portable electronic device of claim 4, wherein the cutout is located to the right of the telephone receiver.

7. The portable electronic device of claim 1, wherein each of the shafts is attached to a respective one of the first sidewall and the second sidewall by an adhesive, or by welding methods.

8. The portable electronic device of claim 1, wherein the shafts are made of rubber material, during assembly, the image capturing assembly is pushed downward along the passage defined by the first sidewall and the second sidewall, deforming the shafts toward the first and second sidewalls, the image capturing assembly is pushed downward until the shafts align with the axis holes, then, the shafts rebound to be pivotably received in the axis holes.

9. The portable electronic device of claim 1, wherein each shaft comprises a surface substantially parallel to the first sidewall and the second sidewall, the surface of each shaft defines a first wire hole, the external sidewalls are substantially parallel to each other, the axis hole is blind hole and define a second wire hole aligning with the first wire hole.

10. The portable electronic device of claim 9, wherein the image capturing assembly comprises a mounting surface, the mounting surface connects substantially perpendicularly between the two external sidewalls, the image capturing assembly comprises a camera module mounting on the mounting surface, the camera is configured for capturing images.

11. The portable electronic device of claim 10, wherein the image capturing assembly comprises a flash mounting on the mounting surface.

12. The portable electronic device of claim 10, wherein the image capturing assembly comprises a light emitting diode on the mounting surface.

\* \* \* \* \*